(12) United States Patent
Poletto et al.

(10) Patent No.: US 7,213,264 B2
(45) Date of Patent: *May 1, 2007

(54) ARCHITECTURE TO THWART DENIAL OF SERVICE ATTACKS

(75) Inventors: Massimiliano Antonio Poletto, Cambridge, MA (US); Dimitri Stratton Vlachos, Somerville, MA (US)

(73) Assignee: Mazu Networks, Inc., Cambridge, MA (US)

( * ) Notice: Subject to any disclaimer, the term of this patent is extended or adjusted under 35 U.S.C. 154(b) by 191 days.

This patent is subject to a terminal disclaimer.

(21) Appl. No.: 10/062,974

(22) Filed: Jan. 31, 2002

(65) Prior Publication Data

US 2003/0145231 A1    Jul. 31, 2003

(51) Int. Cl.
*G06F 12/16* (2006.01)
(52) U.S. Cl. .................................................. 726/22
(58) Field of Classification Search ............... 713/201, 713/200, 154, 187; 726/22–27
See application file for complete search history.

(56) References Cited

U.S. PATENT DOCUMENTS

| | | | | |
|---|---|---|---|---|
| 5,793,753 | A | * | 8/1998 | Hershey et al. ............. 370/252 |
| 5,796,942 | A | | 8/1998 | Esbensen |
| 5,796,956 | A | | 8/1998 | Jones |
| 5,886,643 | A | | 3/1999 | Diebboll et al. |
| 5,892,903 | A | | 4/1999 | Klaus |
| 5,991,881 | A | | 11/1999 | Conklin et al. |
| 6,061,341 | A | | 5/2000 | Andersson et al. |
| 6,061,789 | A | | 5/2000 | Hauser et al. |
| 6,088,804 | A | | 7/2000 | Hill et al. |
| 6,108,782 | A | | 8/2000 | Fletcher et al. |
| 6,269,401 | B1 | * | 7/2001 | Fletcher et al. ............. 709/224 |
| 6,279,113 | B1 | | 8/2001 | Vaidya |
| 6,282,546 | B1 | * | 8/2001 | Gleichauf et al. .......... 707/102 |
| 6,301,668 | B1 | | 10/2001 | Gleichauf et al. |
| 6,304,262 | B1 | | 10/2001 | Maloney et al. |
| 6,321,338 | B1 | | 11/2001 | Porras et al. |
| 6,353,385 | B1 | | 3/2002 | Molini et al. |
| 6,363,489 | B1 | | 3/2002 | Comay et al. |
| 6,370,116 | B1 | | 4/2002 | Giroux et al. |
| 6,381,649 | B1 | | 4/2002 | Carlson |
| 6,388,992 | B2 | | 5/2002 | Aubert et al. |

(Continued)

FOREIGN PATENT DOCUMENTS

EP    1 079 583 A1    2/2001

(Continued)

OTHER PUBLICATIONS

Communications News, Jun. 2000, 37, 6, 48.

(Continued)

*Primary Examiner*—Matthew Smithers
(74) *Attorney, Agent, or Firm*—Fish & Richardson P.C.

(57) ABSTRACT

A monitoring device disposed for thwarting denial of service attacks on the data center is described. The monitoring device includes a plurality of probe devices that are disposed to collect statistical information on packets that are sent between the network and the data center and a cluster head coupled to each of the plurality of probe devices, the cluster head receiving collected statistical information from the probe devices and determining from the collected information whether the data center is under a denial of service attack.

32 Claims, 7 Drawing Sheets

U.S. PATENT DOCUMENTS

| | | |
|---|---|---|
| 6,389,448 B1 | 5/2002 | Primak et al. |
| 6,442,694 B1 | 8/2002 | Bergman et al. |
| 6,487,666 B1 | 11/2002 | Shanklin et al. |
| 6,535,484 B1 | 3/2003 | Hughes et al. |
| 6,578,147 B1 * | 6/2003 | Shanklin et al. ............ 713/200 |
| 6,597,661 B1 | 7/2003 | Bonn |
| 6,597,957 B1 | 7/2003 | Beakley |
| 6,609,205 B1 | 8/2003 | Bernhard et al. |
| 6,678,827 B1 | 1/2004 | Rothermel et al. |
| 6,691,213 B1 | 2/2004 | Luu et al. |
| 6,725,378 B1 | 4/2004 | Schuba et al. |
| 6,738,814 B1 | 5/2004 | Cox et al. |
| 6,775,657 B1 | 8/2004 | Baker |
| 6,789,203 B1 | 9/2004 | Belissent |
| 6,807,667 B1 | 10/2004 | Bar et al. |
| 6,816,910 B1 | 11/2004 | Ricciulli |
| 6,848,005 B1 | 1/2005 | Plevyak et al. |
| 2002/0023089 A1 | 2/2002 | Woo |
| 2002/0031134 A1 | 3/2002 | Poletto et al. |
| 2002/0032774 A1 * | 3/2002 | Kohler et al. ............... 709/225 |
| 2002/0032797 A1 * | 3/2002 | Xu ............................ 709/238 |
| 2002/0032871 A1 * | 3/2002 | Malan et al. ............... 713/201 |
| 2002/0032880 A1 * | 3/2002 | Poletto et al. ................. 714/4 |
| 2002/0035628 A1 | 3/2002 | Gil et al. |
| 2002/0035683 A1 * | 3/2002 | Kaashoek et al. .......... 713/154 |
| 2002/0035698 A1 * | 3/2002 | Malan et al. ............... 713/201 |
| 2002/0038339 A1 * | 3/2002 | Xu ............................ 709/203 |
| 2002/0077786 A1 * | 6/2002 | Vogel et al. ............... 702/188 |
| 2002/0095492 A1 | 7/2002 | Kaashoek et al. |
| 2002/0103886 A1 * | 8/2002 | Rawson, III ............... 709/223 |
| 2002/0103916 A1 | 8/2002 | Chen et al. |
| 2002/0116491 A1 * | 8/2002 | Boyd et al. ................. 709/224 |
| 2003/0046577 A1 * | 3/2003 | Silverman .................. 713/200 |

FOREIGN PATENT DOCUMENTS

| | | |
|---|---|---|
| EP | 001079583 A1 * | 2/2001 |

OTHER PUBLICATIONS

McFaden, Oct. 25, 2000, Ent, 5, 17, 22.

Greene, Feb. 16, 1998, p. 20.

Johnson, Nov. 27, 2000, Network World, p. 86.

Martin, Aug. 14, 2000, Network World, p. 86.

Snyder, Jul. 19, 1999, Network World, p. 53.

Mell, P. et al., "Mobile Agent Attack Resistant Distributed Hierarchical Intrusion Detection Systems," RAID 1999, Sep. 1999, pp. 1-8.

Messmer, E., "Security needs spawn services—Manged detection services growing in popularity", Network World, Apr. 2000, Retrieved from the Internet on May 8, 2005: <URL: http://www.networkworld.com/news/2000/0403_intrusion.html>.

Mansfield et al., "Towards trapping wily intruders in the large", RAID 1999, Sep. 1999, pp. 1-13.

Stallings, William, "Cryptograpy and Network Security", *Principles and Practice*, 2nd Edition, Intruders and Viruses, Chapter 15, pp. 478-501.

Roesch, Martin, "Snort—Lightweight Intrusion Detection for Networks", Proceedings of LISA XIII '99: 13th Systems Administration Conference, Nov. 7-12, 1999, pp. 229-238.

Ohta et al., "Detection, Defense, and Tracking of Internet-Wide Illegal Access in a Distributed Manner", Internet Society, Jul. 18-21, 2000, Retrieved from the Internet on Oct. 27, 2004: <URL: http://www.isoc.org/inet2000/cdproceedings/lf/lf_2.htm>.

"A System for Distributed Intrusion Detection," Snapp et al., *Compcon Spring '91, Digest of Papers*, Davis, CA, Mar. 1991, pp. 1 and 170-176.

* cited by examiner

ARCHITECTURE TO THWART DENIAL OF SERVICE ATTACKS

BACKGROUND

This invention relates to techniques to thwart network-related denial of service attacks.

In denial of service attacks, an attacker sends a large volume of malicious traffic to a victim. In one approach an attacker, via a computer system connected to the Internet infiltrates one or a plurality of computers at various data centers. Often the attacker will access the Internet through an Internet Service Provider (ISP). The attacker by use of a malicious software program places the plurality of computers at the data centers under its control. When the attacker issues a command to the computers at the data centers, the machines send data out of the data centers at arbitrary times. These computers can simultaneously send large volumes of data over various times to the victim preventing the victim from responding to legitimate traffic.

SUMMARY

According to an aspect of the invention, a monitoring device disposed for thwarting denial of service attacks on the data center includes a plurality of probe devices that are disposed to collect statistical information on packets that are sent between the network and the data center and a cluster head coupled to each of the plurality of probe devices, the cluster head receiving collected statistical information from the probe devices and determining from the collected information whether the data center is under a denial of service attack.

According to an additional aspect of the invention, a method of thwarting denial of service attacks on a victim data center coupled to a network includes monitoring network traffic through probes that are disposed between the victim data center and the network and communicating data from the probes, over a dedicated network, to a cluster head device.

According to a still further aspect of the invention, a gateway for thwarting denial of service attacks on a victim includes a cluster head and a plurality of probes disposed between a network and a victim center, the probes collecting statistical data, for performance of intelligent traffic analysis and filtering by the cluster head, to identify malicious traffic for thwarting denial of service attacks.

According to a still further aspect of the invention, a monitoring device disposed for thwarting denial of service attacks on the data center includes a device that collects statistical information on packets that are sent between the network and the data center over a plurality of links and that produces statistical information from network traffic over the plurality of links to determine from the statistical information whether the data center is under a denial of service attack.

According to a still further aspect of the invention, a method of thwarting denial of service attacks on a victim data center coupled to a network includes monitoring network traffic over a plurality of links between the victim data center and the network and communicating data, over a dedicated network, to a control center One or more aspects of the invention may provide one or more of the following advantages.

Aspects of the invention provide a clustered monitor to detect and determine packets that are part of a denial of service attack for data centers that have multiple links to the Internet or traffic levels that are beyond what a single monitor device, e.g. gateway can handle. Thus, the technique protects multiple links between the Internet and a potential victim data center as well as devices located within the data center. The invention can accommodate an arbitrary number of probes and share sufficient information with the probes to monitor traffic passing through the clustered monitor. The clustered monitor can determine if an attack is underway involving the data center. The invention can provide a customer with a single graphical user interface that summarizes cluster's traffic and attack status history. In some embodiments, a probe is statically assigned or hard-wired via a network, whereas in other embodiments a probe can dynamically leave or join a clustered monitor and is as stateless as possible, thus minimizing disruptions to the clustered monitor in the event of failure or other replacement. Probes in a clustered monitor can query and push information to or from the clustered monitor. A full set of detection mechanisms as well as responses to denial of service attacks exist at the cluster level enabling the clustered monitor to be a stand-alone monitor. Alternatively, the arrangement allows the clustered monitor to be coupled to a control center via a hardened redundant network. The clustered monitor can be of a data collector type or a gateway type.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
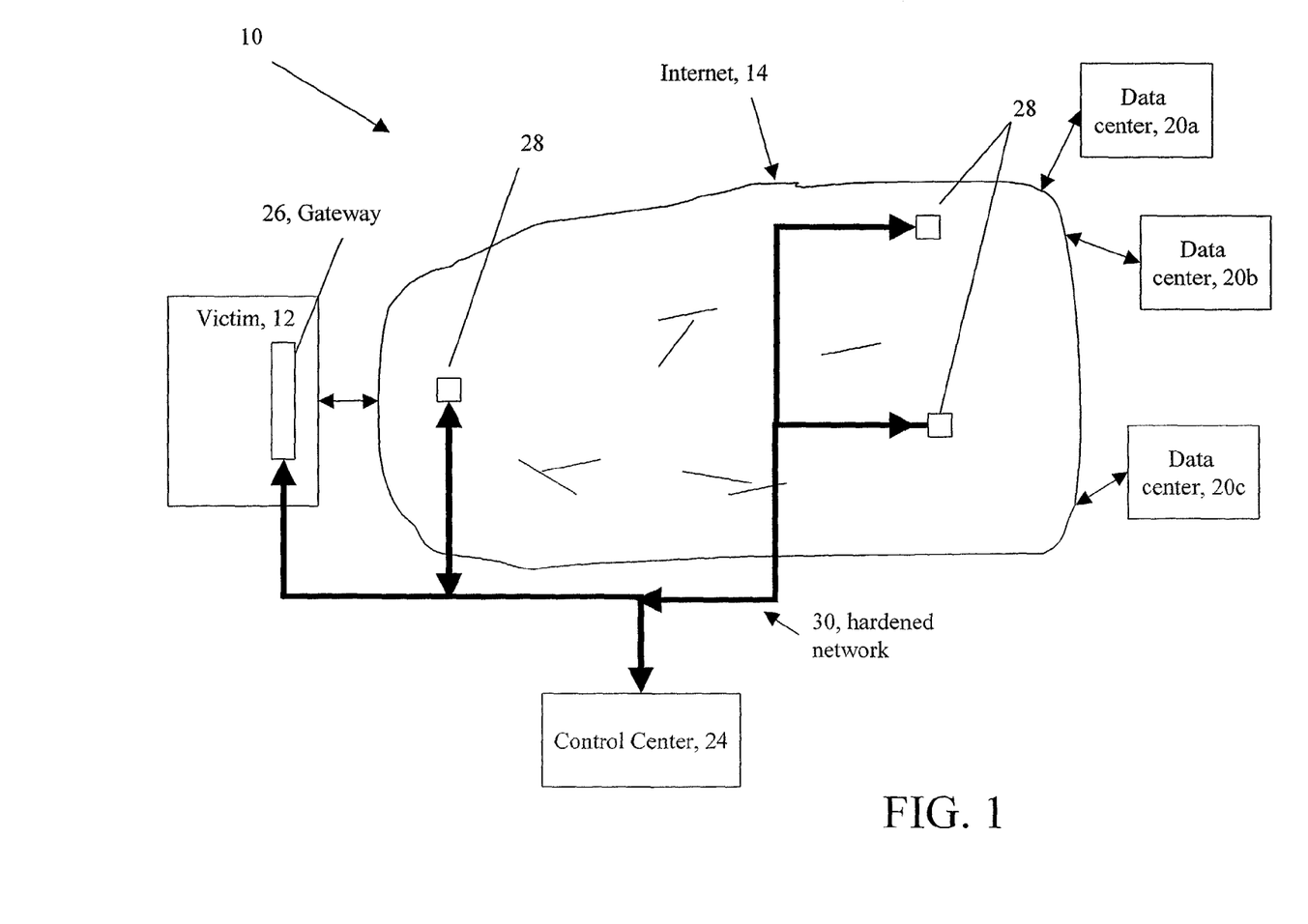
FIG. 1 is a block diagram of networked computers showing an architecture to thwart denial of service attacks.

Referring to FIG. 1, an arrangement 10 to thwart denial of service attacks (DoS attacks) is shown. The arrangement 10 is used to thwart an attack on a victim data center 12, e.g., a web site or other network site under attack. The victim 12 is coupled to the Internet 14 or other network. For example, the victim 12 has a web server located at a data center (not shown).

An attacker via a computer system (not shown) that is connected to the Internet e.g., via an Internet Service Provider (ISP). (not shown) or other approach, infiltrates one or a plurality of computers at various other sites or data centers 20a–20c. The attacker by use of a malicious software program 21 that is generally surreptitiously loaded on the computers of the data centers 20a–20c, places the plurality of computers in the data centers 20a–20c under its control. When the attacker issues a command to the data centers 20a–20c, the data centers 20a–20c send data out at arbitrary times. These data centers 20a–20c can simultaneously send large volumes of data at various times to the victim 12 to prevent the victim 12 from responding to legitimate traffic.

The arrangement 10 to protect the victim includes a control center 24 that communicates with and controls monitor devices, e.g., gateways 26 and data collectors 28 disposed in the network 14. The arrangement protects against DoS attacks via intelligent traffic analysis and filtering that is distributed throughout the network. The control center 24 is coupled to the gateways 26 and data collectors 28 by a hardened, redundant network 30. In preferred embodiments, the network is inaccessible to the attacker. The gateway 26 devices are located at the edges of the Internet 14, for instance, at the entry points of data centers. The gateway devices constantly analyze traffic, looking for congestion or traffic levels that indicate the onset of a DoS attack. The data collectors 28 are located inter alia at major peering points and network points of presence (PoPs). The data collectors 28 sample packet traffic, accumulate, and collect statistical information about network flows.

All deployed monitor devices e.g., gateways 26 and data collectors 28 are linked to the central control center 24. The control center 24 aggregates traffic information and coordinates measures to track down and block the sources of an attack. The arrangement uses a distributed approach that analyzes and determines the underlying characteristics of a DoS attack to produce a robust and comprehensive DoS solution. Thus, this architecture 10 can stop new attacks rather than some solutions that can only stop previously seen attacks. Furthermore, the distributed architecture 10 will frequently stop an attack near its source, before it uses bandwidth on the wider Internet 14 or congests access links to the targeted victim 12.

A virus is one way to get attacks started. When surfing a web page a user may download something, which contains a virus that puts the user's computer under the control of some hacker. In the future, that machine can be one of the machines that launches the attack.

Some or all of the deployed monitor devices in the arrangement are clustered monitors. Such clustered monitors can include clustered gateways and clustered data collectors that are linked to the central control center 24. As shown in FIG. 1, the gateway 26 is a clustered device and is hereinafter referred to as clustered gateway 26. However, the data collectors 28 could also be clustered devices. Further, the arrangement 10 could be comprised of clustered and non-clustered devices.

A clustered monitor, e.g., a clustered gateway 26 monitors a plurality of links that exist between the victim center 12 and the Internet 14. Features of the clustered monitor include the use of stateless probes that are scaleable. The clustered monitor itself is not vulnerable to a denial of service attack. That is, when a system behind the cluster is being attacked, the cluster head itself should not see a huge increase in traffic load. The cluster head can also analyze traffic on asymmetric links and treat the traffic on all of the monitored links as if the traffic originated on one virtual link.

Figure 2:
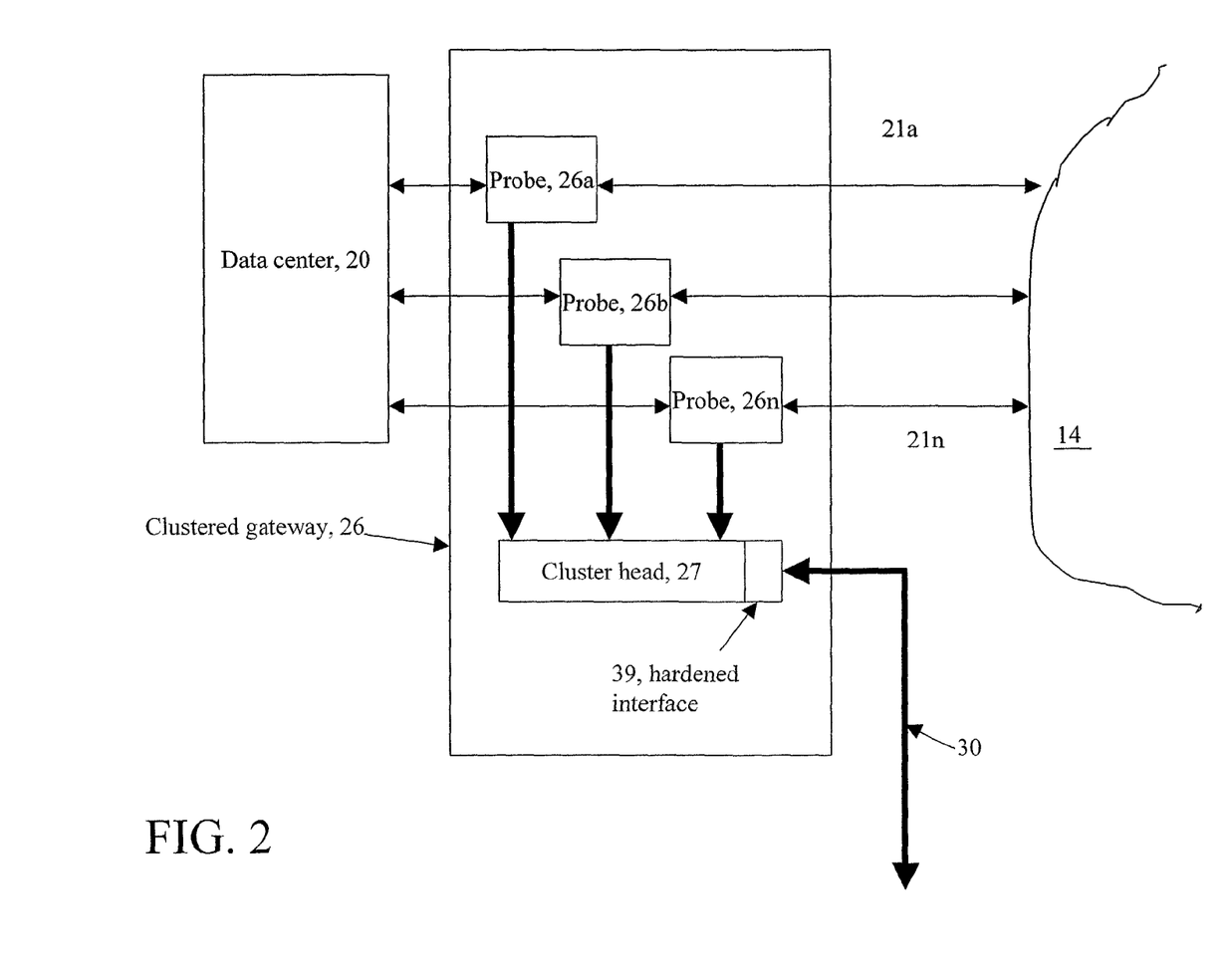
FIG. 2 is a block diagram depicting the architecture of a clustered gateway.

Referring now to FIG. 2, the data center 20 has a plurality of links 21a–21n with the Internet 14. The links exist through various network architectural arrangements, the details of which are not an important consideration here. The data center 20 is protected by a clustered gateway 26 that comprises a plurality of probe devices 26a–26n, which are here shown coupled in-line with the links between the data center 20 and the Internet 14. The probe devices 26a–26n have connections to a cluster head device 27.

The cluster head device 27 likewise can have an optional and/or hardened redundant network interface 39 connection to a hardened/redundant network 30. This interface is used to connect the cluster head device 27 to the control center 24 (FIG. 1) or to allow an operator access to the clustered monitor.

Probes 26a–26n perform several functions such as sampling of packets and collecting statistical information of packets that they see. In preferred embodiments, the probes 26a–26n examine every packet for statistical analysis purposes and randomly choose selected numbers of packets per second to pass to the cluster head 27. The cluster head 27 is responsible for receiving the sampled traffic packets and summary information provided from the probes 26a–26n. The cluster head 27 analyzes the traffic for detection of denial of service attacks using any known algorithms or the algorithms described below. The cluster head 27 also provides a user interface into the traffic analysis and also communicates with the control center 24. The cluster head 27 is connected to the probes 26a–26n. In one embodiment, a network type of connection provides connectivity between the cluster head 27 and probes 26a–26n. An exemplary type of network connection is a 100 Mbit Ethernet network. Other connections and other network configurations, of course, could be used. Preferably this connection is a private network used only for intra-cluster communications. As a probe 26a–26n starts up and joins the cluster, it obtains an IP address on the network and begins sending sample packets and statistical information to the cluster head 27 as will be described below.

The arrangement provides a straightforward manner to set up a cluster topology. The arrangement does not need a leader election protocol. Rather, a single cluster head 27 is used per cluster with all other probes as members. The cluster head 27 need not know explicitly about any particular cluster member. When a new cluster member is added to a cluster, the new cluster member can dynamically discover its cluster head and join the cluster. The cluster head will allow/deny the member to join the cluster or can be directly connected in a hardwired point-to-point connection. The cluster head will keep a minimal amount of information for each member of the cluster to facilitate debugging and analysis.

The links between cluster heads and probes can be fast connections, e.g., 100 Mb/s Ethernet. To achieve this a cluster member must be on the same IP network as the cluster head. In some embodiments, the DHCP protocol can be used whereas, in others a Cluster Discovery Protocol (CDP) described below can be used.

Figure 3:
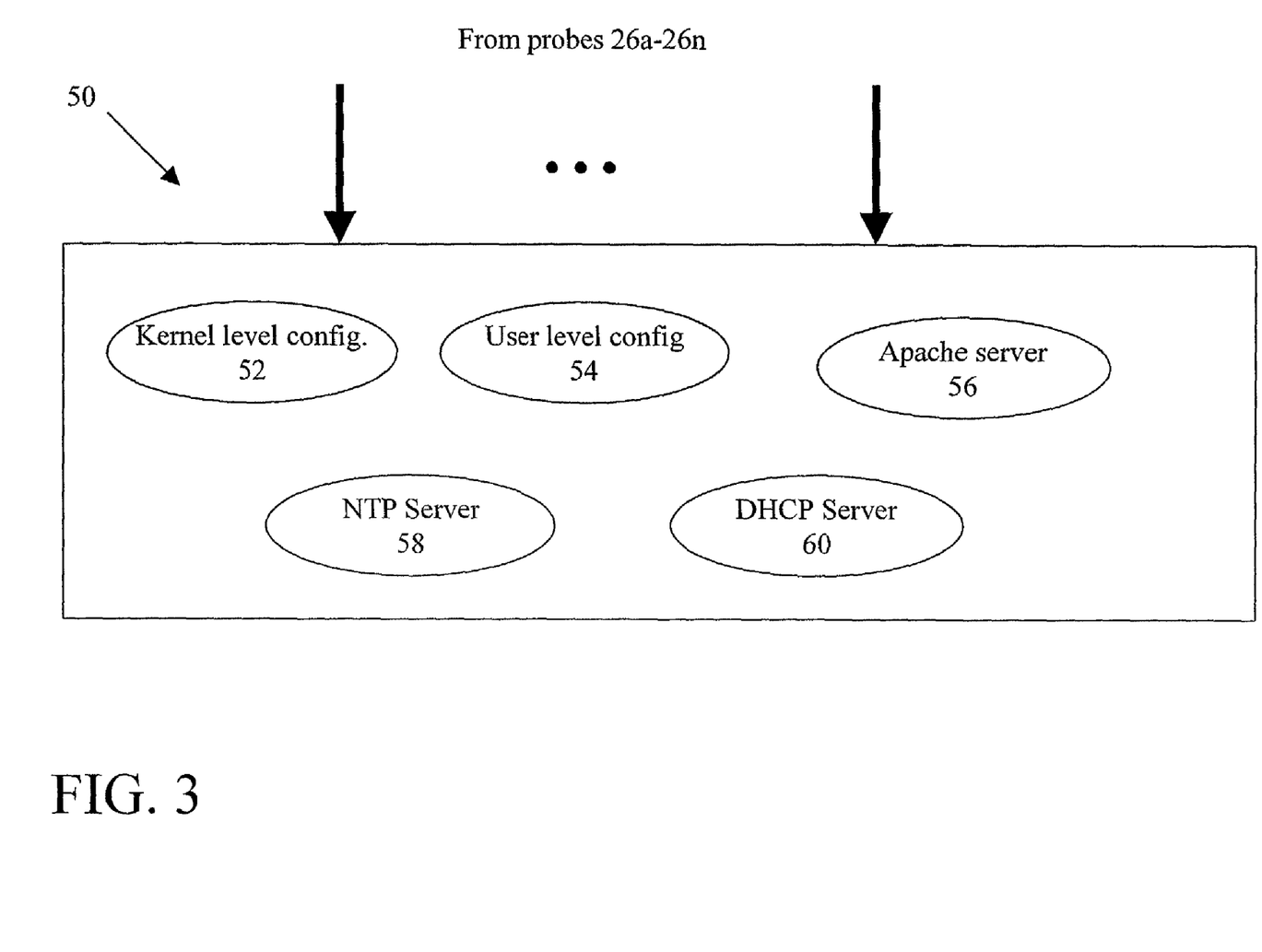
FIG. 3 is a block diagram depicting processes that execute on a cluster head.

Referring now to FIG. 3, exemplary processes 50 that run on a cluster head 27 are shown. The cluster head 27 will include a kernel level configuration process 52 and a user level configuration process 54. The kernel level 52 configuration process in one implementation can be a Click kernel process, as described in the Appendix. The kernel level configuration process aggregates 52 traffic from various probes 26a–26n. The user-level configuration process 54 produces logs and runs detection algorithms. The cluster head 27 also includes a HTTP server or web server 56 such as an Apache server, as well as a time synchronization process such as NTP (network time protocol) 58. The cluster head 27 also includes a process 60 to allow the cluster head 27 to automatically assign an IP address to the probe. One example of such a process is the DHCP, e.g., dynamic host configuration protocol, which is a network protocol that enables an DHCP server to automatically assign an IP address to individual computers.

Figure 4:
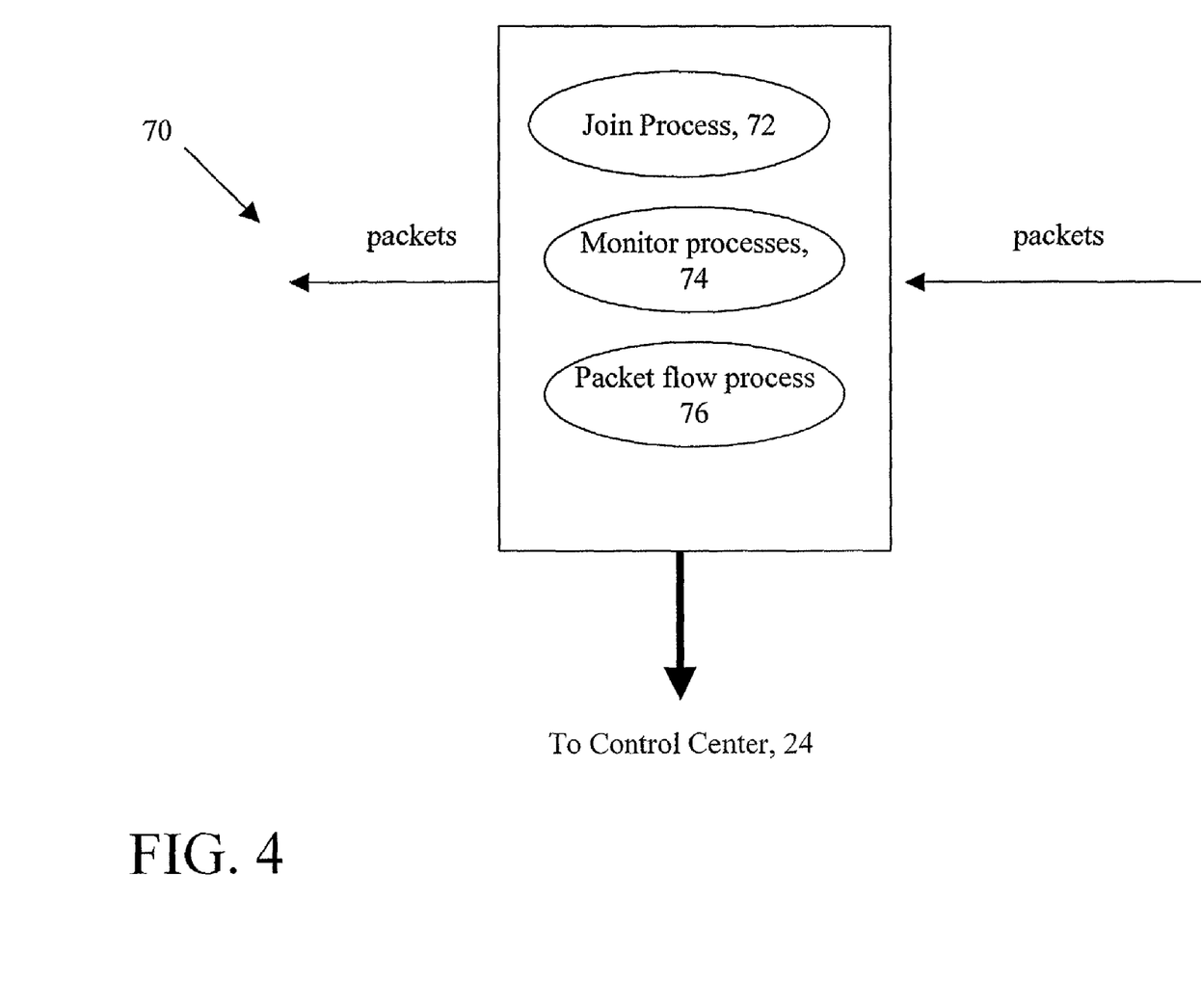
FIG. 4 is a block diagram depicting processes that execute on a probe gateway.

Referring now to FIG. 4, exemplary processes 70 that execute on probe 26a are shown. The probe 26a executes a joining process 72 to permit the probe 26a to join an existing, operating cluster. The probe 26a also includes a monitor process 74 that collects statistical information on packets. The packets can pass through the probe 26a in implementations where the probe 26a is disposed in-line, or are sampled by the probe 26a in implementations where the probed is disposed to tap copied packets from a link. In either event the probe 26a is disposed between the data center and the network. The probe 26a also executes a packet flow process 76 that statistically samples random packets and sends those packets to the cluster head 27.

Figure 5:
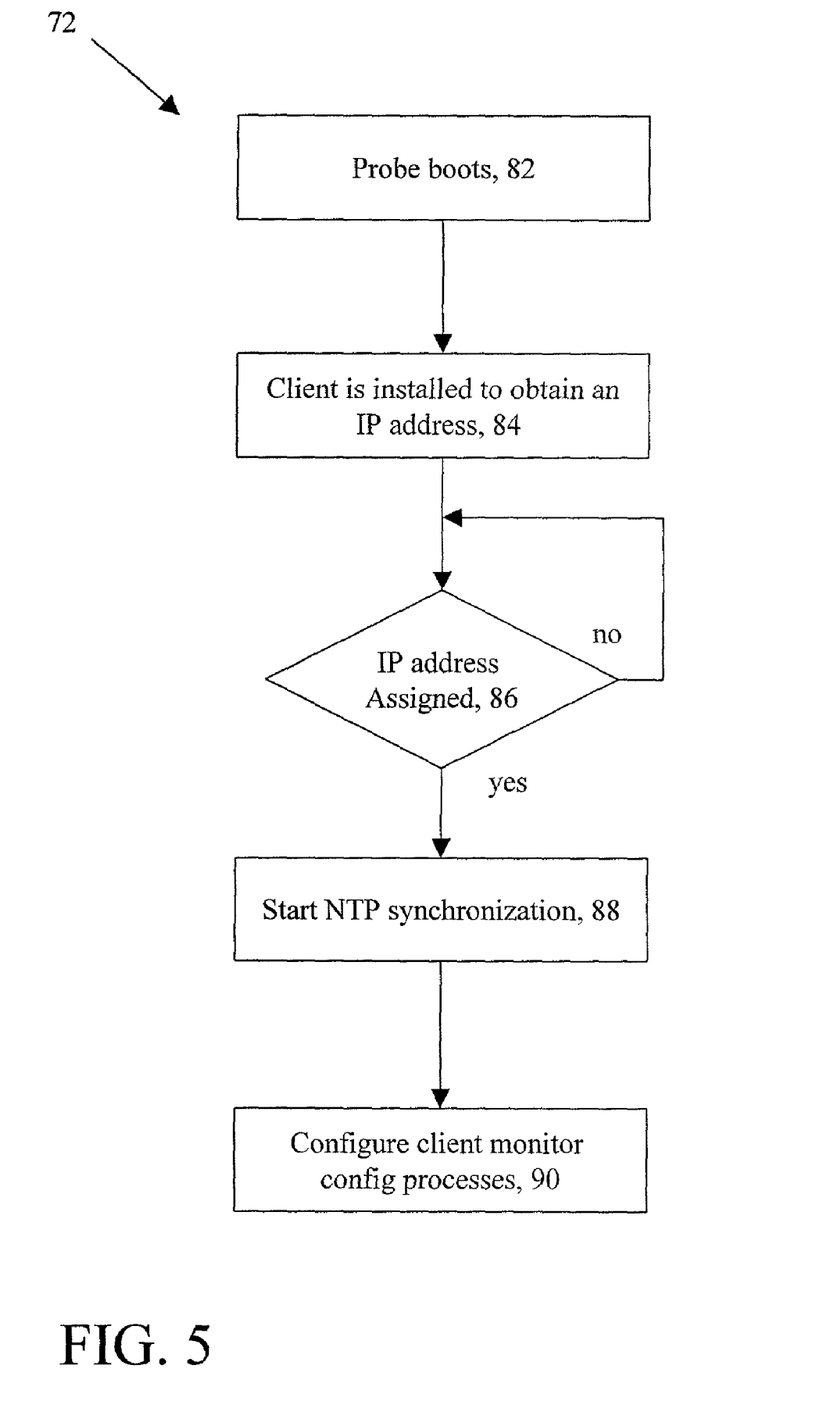
FIG. 5 is a flow chart depicting a joining process for a probe member.

Referring to FIG. 5, the joining process 72 on the probes 26a–26n, is shown for probe 26a. During the joining process 72 the probe is booted 82. Once the probe boots, the probe executes a script. The script installs 84 kernel Click config (which is shown as 74 and 76 in FIG. 4), and runs a DHCP client application) to obtain a IP address from the cluster head. Once the IP address is assigned, the join process 72 will start 88 a NTP (Network Time Protocol, or equivalent) synchronization process between cluster head and probe to allow the probe to maintain the same time as other probes in the cluster, as well as the cluster head 27. After the NTP synchronization process 88, the process 72 configures 90 the monitor configuration in the Click kernel to enable the probe to collect statistical information concerning traffic flow to the probe, e.g., 26a, as well as to sample selected numbers of packets to send to the cluster head 27.

A probe can have a serial port for debugging/configuring that is accessed via the cluster network.

Figure 6A:
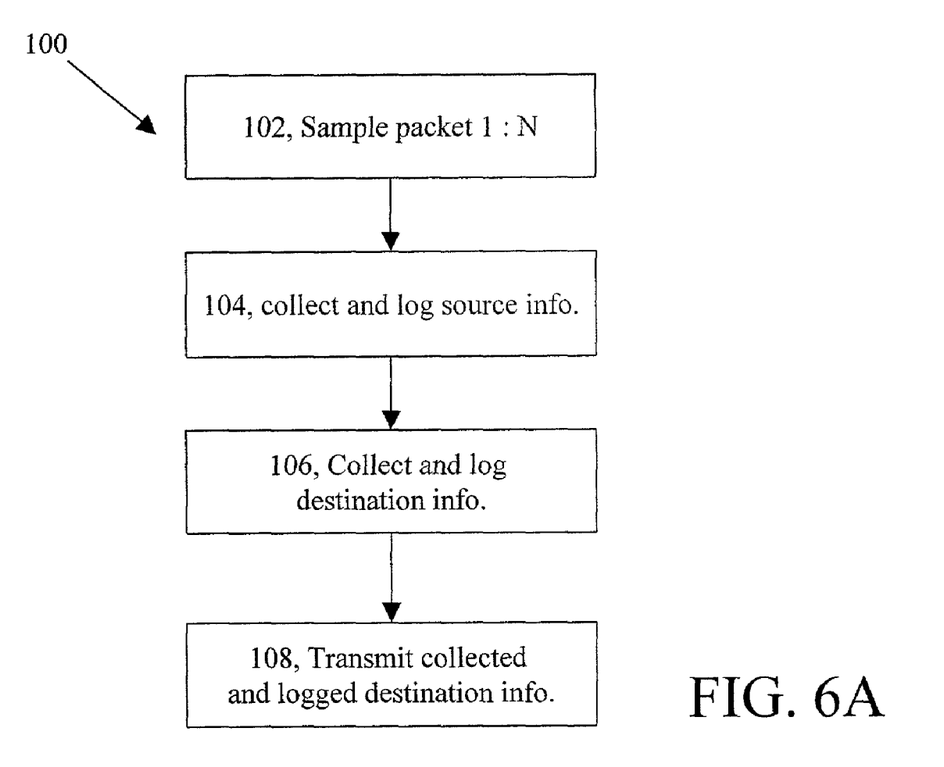
FIGS. 6A and 6B depict respectively probe and cluster head functionality.
Figure 6B:
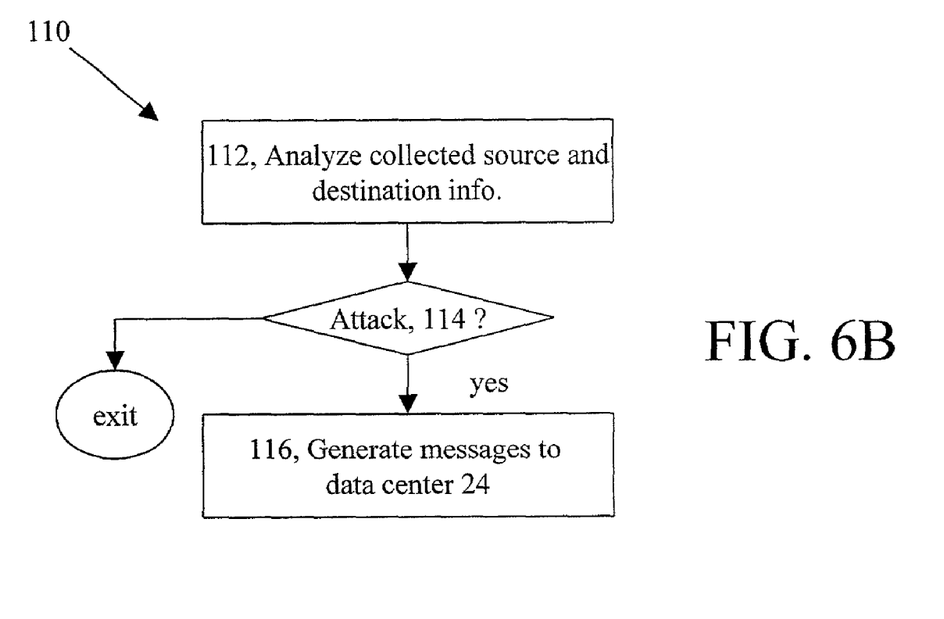

Referring now to FIGS. 6A and 6B, an exemplary operational process that can occur on one or more probes 26a–26n and the cluster head 27 is shown. On the probes a process 100 is used to sample 102 one in every N packets or to provide a random sampling of said packets. The process 100 also collects 104 and logs source information from all packets and will collect and log 106 destination information from all packets. The process 100 also collects information regarding the packet type and so forth. At respective points in time, the process 100 will transmit 108 the collected destination and source information as well as other statistical information to the cluster head 27 and will likewise transmit sample packets to the cluster head 27. The cluster head 27 can maintain a stable log or file system to maintain the information for an indefinite period of time.

Referring to FIG. 6B, a process 110 is shown that executes on the cluster head 27. The process 110 includes a process 112 to analyze collected source and destination information and to determine 114 whether or not the information corresponds to an attack on the victim center. If the information corresponds to an attack, the process 110 generates 116 a response to the attack. Exemplary responses can be to send a message to the data center 24 that an attack is underway. Optionally, a response can involve determining the nature of the attack and source of the attack at the gateway. In this option, the gateway 26 can determine corrective measures such as installing filters on nearby routers or by installing a filter in one or more of the probes 26a–26n (if the probes are in-line). These filters block undesired network traffic as will be discussed below.

The cluster head 27 makes decisions about the health of the traffic passing by the cluster 26 and keeps logs (not shown) of the traffic. To do this the cluster head 27 examines a subset of the packets flowing by the cluster members, and the counters obtained from probes 26a–26n. The cluster head 27 uses the counter information and sampled packets to determine if a cluster 26 is involved in an attack and the traffic subset will be used for logging.

With an implementation using Click, all information is contained in packets. Thus, packets are delivered from cluster probes 26a–26n to a cluster head 27. This can present a problem since the system needs to both maintain contents (including annotations) of a packet as it is transported from probe 26a–26n to head 27, and needs to distinguish different types of packets at the cluster head 27.

One specific implementation to solve these problems includes four Click elements: IPEncap, IPClassifier, PackWithAnno, and UnpackWithAnno. Also, reliable queue {Rx, Tx} is used for reliable delivery.

The traffic on the intra-cluster network would include:
NTP traffic: for time synchronization (bi-directional)
DHCP traffic: for IP address management (bi-directional)
RSH protocol a bi-directional protocol for probe traffic.
IP protocol 127: randomly sampled packets (probe to cluster head)
IP protocol 128: counter summary log packets (probe to cluster head)

The specific traffic flows can be bi-directional and are encapsulated via the PackWithAnno element on the probe and decapsulated with the UnpackeWithAnno element at the cluster head. Note that the packets are raw IP packets, i.e., the packets do not run over a user datagram or Transport UDP/TCP. With this deliver process packet size is watched carefully so as to not exceed the MTU. As exemplary parameters, the counter summary packets can be sent once per second, the TCP monitoring packets can be sent twice per report. Sampled packets are sent according to a sampling rate set for the probe. An exemplary setting is 10,000 PPS although slower or faster rates could be used. The sample packets produce the logs mentioned above. The counter summary log packets and the TCP rate monitor packets are used in attack detection heuristics. The traffic rate on the intra-cluster network should be predictable regardless of the traffic rate the cluster itself is seeing. This prevents dos attacks from loading the cluster's network. With the parameter values mentioned above the predicted traffic per probe rates: 10,000 (sample)+1(counter summary)+2(IP Rate monitor). The NTP and DHCP packet loads are negligible.

The gateway 26 monitoring process 74 (FIG. 4) monitors traffic that passes through the gateway and includes a communication process (not shown) that communicates statistics collected in the gateway 26 with the data center 24. The gateway 26 uses a separate interface over a private, redundant network, such as a modem 39 over the telephone network or a leased line, a network adapter over a LAN, etc. to communicate with the control center 24. Other interface types are possible. In addition, the gateway 26 can include processes (not shown) to allow an administrator to insert filters to block, i.e., discard packets that the device deems to be part of an attack, as determined by heuristics described below.

Figure 7:
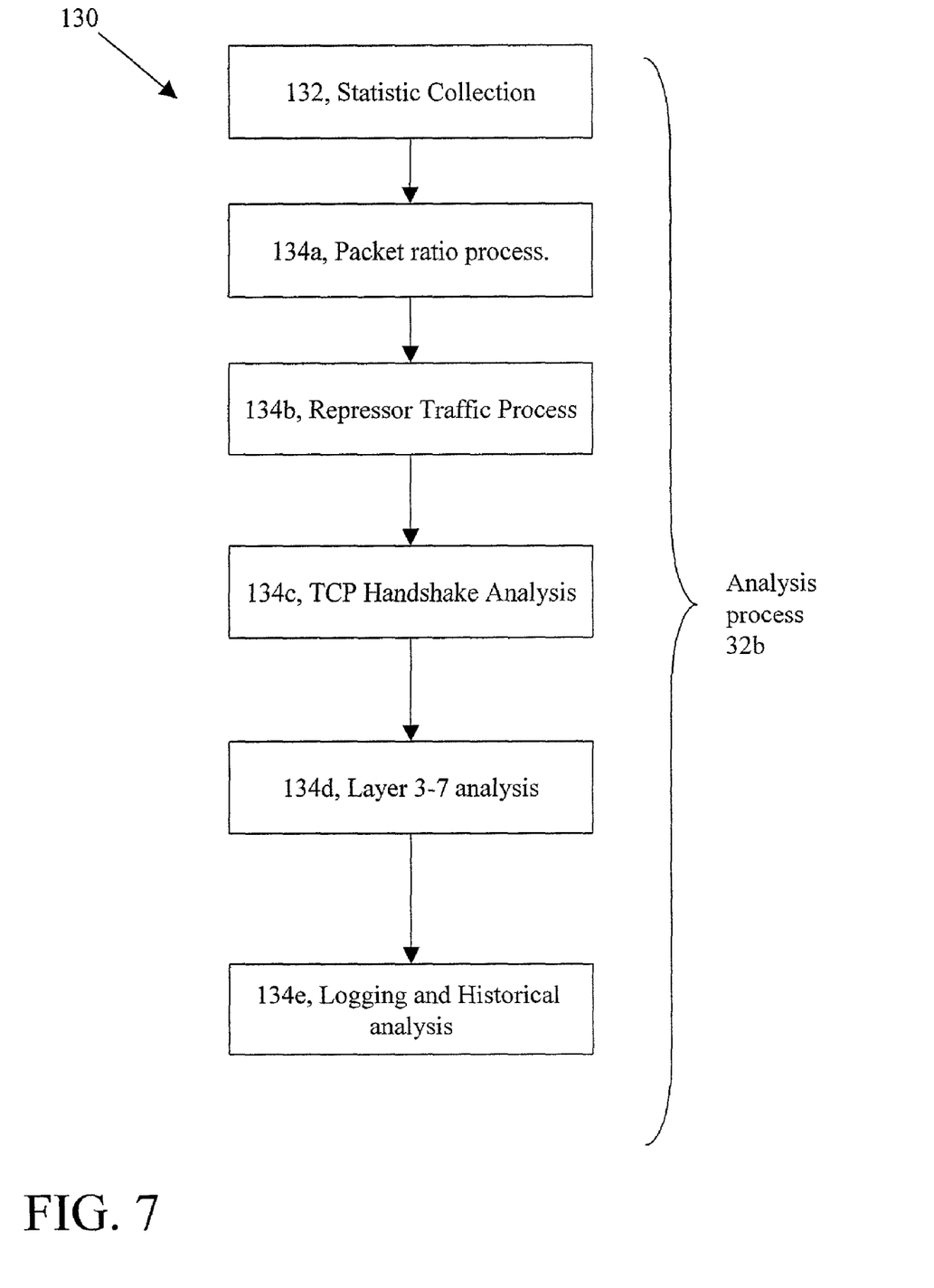
FIG. 7 is a flow chart depicting exemplary analysis processes in the cluster head.

Referring to FIG. 7, exemplary techniques 130 to determine if a data center is under attack are shown. The gateway 26 collects statistics 132 and analyzes the statistics according to one or more of the algorithms 134a–134e described below. Other algorithms can be used.

Several methods can be used separately or in combination to detect malicious traffic flows. For example, the gateway 26 can detect DoS attacks using at least one or more of the following methods including: analyzing packet ratios of TCP-like traffic; analyzing "repressor" traffic for particular types of normal traffic; performing TCP handshake analysis;

performing various types of packet analysis at packet layers 3–7; and logging/historical analysis.

Packet Ratios for TCP-Like Traffic 134*a*.

The Transmission Control Protocol (TCP) is a protocol in which a connection between two hosts, a client C, e.g. a web browser, and a server S, e.g. a web server, involves packets traveling in both directions, between C and S and between S and C. When C sends data to S and S receives it, S replies with an ACK ("acknowledgement") packet. If C does not receive the ACK, it will eventually try to retransmit the data to S, to implement TCP's reliable delivery property. In general, a server S will acknowledge (send an ACK) for every packet or every second packet.

The monitoring process in the gateway 26 can examine a ratio of incoming to outgoing TCP packets for a particular set of machines, e.g. web servers. The monitoring process can compare the ratio to a threshold value. The monitoring process can store this ratio, time stamp it, etc. and conduct an ongoing analysis to determine over time for example how much and how often it exceeds that ratio. As the ratio grows increasingly beyond 2:1, e.g., up to about 3:1 or so, it is an increasing indication that the machines are receiving bad TCP traffic, e.g., packets that are not part of any established TCP connection, or that they are too overloaded to acknowledge the requests.

The monitoring process can monitor rates as bytes/sec and packets/sec rates of total, UDP, ICMP, and fragmented traffic in addition to TCP traffic. The thresholds are set manually by an operator. In some embodiments the device can provide a "threshold wizard" which uses historical data to help the user to set thresholds. An alternate implementation could automatically generate time-based thresholds using historical data.

The gateway 26 divides traffic into multiple buckets, e.g. by source network address, and tracks the ratio of ingoing to outgoing traffic for each bucket. As the ratio for one bucket becomes skewed, the gateway 26 may subdivide that bucket to obtain a more detailed view. The gateway 26 raises 90 a warning or alarm to the data center 24 and/or to the administrators at the victim site 12.

Another alternate implementation could combine thresholds with a histogram analysis, and trigger traffic characterization whenever a histogram for some parameter differed significantly (by a uniformity test, or for example, by subtracting normalized histograms) from the historical histogram.

Repressor Traffic 134*b*.

The phrase "repressor traffic" as used herein refers to any network traffic that is indicative of problems or a potential attack in a main flow of traffic. A gateway 26 may use repressor traffic analysis to identify such problems and stop or repress a corresponding attack.

One example of repressor traffic is ICMP port unreachable messages. These messages are generated by an end host when the end host receives a packet on a port that is not responding to requests. The message contains header information from the packet in question. The gateway 26 can analyze the port unreachable messages and use them to generate logs for forensic purposes or to selectively block future messages similar to the ones that caused the ICMP messages.

TCP Handshake Analysis 134*c*.

A TCP connection between two hosts on the network is initiated via a three-way handshake. The client, e.g. C, sends the server, e.g. S, a SYN ("synchronize") packet. S the server replies with a SYN ACK ("synchronize acknowledgment") packet. The client C replies to the SYN ACK with an ACK ("acknowledgment") packet. At this point, appropriate states to manage the connection are established on both sides.

During a TCP SYN flood attack, a server is sent many SYN packets but the attacking site never responds to the corresponding SYN ACKs with ACK packets. The resulting "half-open" connections take up state on the server and can prevent the server from opening up legitimate connections until the half-open connection expires, which usually takes 2–3 minutes. By constantly sending more SYN packets, an attacker can effectively prevent a server from serving any legitimate connection requests.

One type of attack occurs during connection setup. At setup the gateway forwards a SYN packet from the client to the server. The gateway forwards a resulting SYN ACK packet from a server to client and immediately sends ACK packet to the server, closing a three-way handshake. The gateway maintains the resulting connection for a variable timeout period. If the packet does not arrive from client to server, the gateway sends a RST ("reset") to the server to close the connection. If the ACK arrives, gateway forwards the ACK and forgets about the connection, forwarding subsequent packets for that connection. The variable timeout period can be inversely proportional to number of connections for which a first ACK packet from client has not been received. In a passive configuration, a cluster 26 can keep track of ratios of SYNs to SYN ACKs and SYN ACKs to ACKs, and raise appropriate alarms when a SYN flood attack situation occurs.

Layer 3–7 Analysis 134*d*.

With layer 3–7 analysis, the gateway 26 looks at various traffic properties at network packet layers 3 through 7 to identify attacks and malicious flows. These layers are often referred to as layers of the Open System Interconnection (OSI) reference model and are network, transport, session, presentation and application layers respectively. Some examples of characteristics that the gateway may look for include:

1. Unusual amounts of IP fragmentation, or fragmented IP packets with bad or overlapping fragment offsets.
2. IP packets with obviously bad source addresses, or ICMP packets with broadcast destination addresses.
3. TCP or UDP packets to unused ports.
4. TCP segments advertising unusually small window sizes, which may indicate load on server, or TCP ACK packets not belonging to a known connection.
5. Frequent reloads that are sustained at a rate higher than plausible for a human user over a persistent HTTP connection.

The monitoring process determines the rates or counts of these events. If any of the rates/counts exceeds a particular threshold, the cluster device considers this a suspicious event and begins attack characterization process.

Several attack characterization processes can be used. One type in particular uses histograms to characterize the type of attack that was detected. Co-pending U.S. patent application Ser. No. 10/066,232 filed on Jan. 31, 2002, and entitled "DENIAL OF SERVICE ATTACKS CHARACTERIZATION", which is assigned to the assignee of the present invention and incorporated herein by reference.

Logging and Historical Traffic Analysis 134*e*.

The gateways 26 and data collectors 28 keep statistical summary information of traffic over different periods of time and at different levels of detail. For example, a gateway 26 may keep mean and standard deviation for a chosen set of parameters across a chosen set of time-periods. The parameters may include source and destination host or network addresses, protocols, types of packets, number of open connections or of packets sent in either direction, etc. Time periods for statistical aggregation may range from minutes to weeks. The device will have configurable thresholds and will raise warnings when one of the measured parameters exceeds the corresponding threshold.

The gateway 26 can also log packets. In addition to logging full packet streams, the gateway 26 has the capability to log only specific packets identified as part of an attack (e.g., fragmented UDP packets or TCP SYN packets that are part of a SYN flood attack). This feature of the gateway 26 enables administrators to quickly identify the important properties of the attack.

Alternatively, a gateway 26 can tap a network line without being deployed physically in line, and it can control network traffic, for example, by dynamically installing filters on nearby routers. The gateway 26 would install these filters on the appropriate routers via an out of band connection, i.e. a serial line or a dedicated network connection. Other arrangements are of course possible.

Aspects of the processes described herein can use "Click," a modular software router system developed by The Massachusetts Institute of Technology's Parallel and Distributed Operating Systems group. A Click router is an interconnected collection of modules or elements used to control a router's behavior when implemented on a computer system. Other implementations can be used. Other embodiments are within the scope of the appended claims.

What is claimed is:

1. A monitoring device disposed for thwarting denial of service attacks on a data center, the monitoring device comprising:
    a plurality of probe devices that are coupled to links that couple the network to the data center and collect statistical information on packets that are sent over the links that couple the network to the data center;
    a cluster head coupled to each of the plurality of probe devices, the cluster head receiving collected statistical information from the probe devices and determining from the collected information whether the data center is under a denial of service attack.

2. The device of claim 1 wherein the cluster head is coupled to the plurality of probe devices through a dedicated, private network, that is a different network from the network being monitored.

3. The device of claim 2 wherein the cluster head further comprises:
    a communication process that sends statistics collected by the probe devices to a control center, and that receives queries or instructions from the control center.

4. The device of claim 3 wherein the monitoring device is a gateway device and further comprises:
    a process to install filters to thwart denial of service attacks by removing network traffic that is deemed part of an attack.

5. The device of claim 1 wherein the probes are physically deployed in line in the links that couple the network to the data center with each of the probes deployed to monitor one or more links.

6. The device of claim 1 wherein the probes execute a joining process that allows the probes to join the device.

7. The device of claim 1 wherein the cluster head comprises a process to aggregate statistics collected from the probes and to produce logs and apply detection heuristics to the statistics collected from the probes.

8. The device of claim 1 wherein the probes are coupled between the network and the data center to monitor traffic on links that couple the data center to the network.

9. The device of claim 1 wherein the probes are scaleable and can dynamically join or leave the cluster.

10. The device of claim 1 wherein the cluster head analyzes traffic on the links and treats the traffic on the monitored links as if the traffic originated on one virtual link.

11. The device of claim 1 wherein at least one of the probes examines packets sent across the link that the at least one probe monitors and randomly chooses selected numbers of packets per second to pass to the cluster head.

12. A method of thwarting denial of service attacks on a victim data center coupled to a network comprises:
    monitoring network traffic through probes that are coupled to links between the victim data center and the network; and
    communicating data from the probes, over a dedicated network, to a cluster head device.

13. The method of claim 12 further comprising: communicating data from the cluster head device to a control center over a hardened network.

14. The method of claim 12 further comprising:
    analyzing network traffic statistics to identify malicious network traffic; and
    filtering network traffic, which is identified as malicious network traffic, during analyzing of the network traffic.

15. The method of claim 12 further comprising providing the cluster head device and the probe devices as a clustered gateway.

16. The method of claim 15 wherein when a new cluster probe seeks to join to the clustered gateway, the method further comprises:
    dynamically discovering the new cluster probe that seeks to join the clustered gateway.

17. The method of claim 12 further comprising:
    performing intelligent traffic analysis and filtering to identify the malicious traffic and to eliminate the malicious traffic.

18. The method of claim 17 wherein performing intelligent traffic analysis is controlled by the cluster head and filtering is performed by the probes.

19. The method of claim 12 wherein monitoring comprises disposing the probes to monitor traffic on links that couple the data center to the network.

20. A gateway for thwarting denial of service attacks on a victim data center comprises:
    a cluster head; and
    a plurality of probes disposed to monitor links that couple a network and a victim data center, the probes collecting statistical data, for performance of intelligent traffic analysis and filtering by the probes, to identify malicious traffic for thwarting denial of service attacks.

21. The gateway of claim 20 wherein the gateway includes a process to insert filters to discard packets that are deemed to be part of an attack.

22. The device of claim 20 wherein the probes are coupled between the network and the data center to monitor traffic on links that couple the data center to the network.

23. A monitoring device disposed for thwarting denial of service attacks on a data center, the monitoring device comprising:
    a device that collects statistical information on packets that are sent between the network and the data center over a plurality of links and that produces statistical information from network traffic over the plurality of links to determine from the statistical information whether the data center is under a denial of service attack.

24. The monitoring device of claim 23 wherein the monitoring device is coupled to a control center through a hardened network.

25. The device of claim 24 wherein the probes are coupled between the network and the data center to monitor traffic on links that couple the data center to the network.

26. The monitoring device of claim 23 wherein the device further comprises:
a communication process that communicates statistics with a control center, and that receives queries or instructions from the control center.

27. The monitoring device of claim 23 wherein the monitoring device is a gateway device and further comprises:
a process to install filters to thwart denial of service attacks by removing network traffic that is deemed part of an attack.

28. The monitoring device of claim 27 wherein the gateway comprises:
a process to aggregate statistics collected from the various links and to produce logs and detection heuristics concerning the statistics collected from the probes.

29. A method of thwarting denial of service attacks on a victim data center coupled to a network comprises:
monitoring network traffic over a plurality of links between the victim data center and the network; and
communicating data to a control center, with communicating occurring over a redundant network that is a different network from the network being monitored.

30. The method of claim 29 wherein monitoring is performed by probe devices that sample network traffic at a constant rate.

31. The method of claim 30 further comprising:
delivering the sampled network traffic by the probes to a clustered head for traffic analysis.

32. The method of claim 31 wherein the probes send the sampled network traffic to the cluster head at a substantially constant rate irrespective of traffic on the monitored network.

* * * * *